United States Patent [19]

Bender

[11] Patent Number: 5,337,981

[45] Date of Patent: Aug. 16, 1994

[54] METHOD AND APPARATUS FOR COMPENSATING FOR SOLAR TORQUE TRANSIENTS ON A SATELLITE DURING A SOLAR ECLIPSE

[75] Inventor: Douglas J. Bender, Redondo Beach, Calif.

[73] Assignee: Hughes Aircraft Company, Los Angeles, Calif.

[21] Appl. No.: 800,775

[22] Filed: Nov. 27, 1991

[51] Int. Cl.⁵ ............................................... B64G 1/24
[52] U.S. Cl. .................................. 244/164; 244/165; 364/434
[58] Field of Search ............... 244/164, 168, 171, 173; 364/433, 434

[56] References Cited

U.S. PATENT DOCUMENTS

| | | | |
|---|---|---|---|
| Re. 29,177 | 4/1977 | Michaelis | 244/166 |
| 4,071,211 | 1/1978 | Muhlfelder et al. | 244/165 |
| 4,188,666 | 2/1980 | Legrand et al. | 244/164 |
| 4,837,699 | 6/1989 | Smay et al. | 244/169 |
| 4,960,250 | 10/1990 | Schmidt | 244/164 |

Primary Examiner—Michael S. Huppert
Assistant Examiner—Anne E. Bidwell
Attorney, Agent, or Firm—William J. Streeter; Wanda K. Denson-Low

[57] ABSTRACT

This invention discloses a method for determining when an orbiting satellite (10) is eclipsed from the sun in order to remove control torques to the satellite (10) which compensate for the disturbance of solar pressure on the satellite (10). A current measuring device (46) measures the current traveling through a particular circuit associated with the satellite (10) which is indicative of the satellite batteries being discharged, as would occur during an eclipse. The measured current is applied to a threshold logic circuit (48) which sends a signal to a control compensator (36) if the measured current exceeds a predetermined threshold level. Consequently, the compensation provided by the control compensator (36) removes the compensation for compensating for solar pressure when the satellite (10) is in an eclipse. In a second implementation, the threshold logic circuit (48) is replaced with a proportionality logic circuit to compensate for the effects of partial eclipses.

14 Claims, 4 Drawing Sheets

METHOD AND APPARATUS FOR COMPENSATING FOR SOLAR TORQUE TRANSIENTS ON A SATELLITE DURING A SOLAR ECLIPSE

BACKGROUND OF THE INVENTION

1. Technical Field

This invention relates generally to a method of compensating for pointing of an orbiting satellite, and more particularly, to a method for compensating for the effects of solar pressure on the pointing direction of an orbiting satellite as the satellite goes into and out of eclipse by the sun.

2. Discussion

A geosynchronous earth orbit, as is known in the art, is the orbit about the earth in which a satellite or spacecraft will remain fixed above a specific location on the earth. This orbit is at a distance of approximately 22,400 miles above the earth. In this orbit, a beam, such as a communications beam, from the satellite can be maintained over a desirable area on the earth, such as a particular country, thus establishing an area which will receive the beam. To remain in a geosynchronous orbit it is necessary that the satellite be in an orbit substantially within the equatorial plane of the earth at the desirable distance, and that the satellite's attitude be oriented perpendicular to this plane. Any deviation or disturbance which causes the satellite to direct its antenna away from a boresight location on the earth tends to effect the coverage area of the beam, and thus, produces undesirable results. Many different forces are in effect on the satellite which tend to alter the satellite's antenna pointing direction.

As a first order method for countering the effects of the different forces acting on the satellite, it is known to stabilize the satellite's attitude by providing an angular bias momentum which resists changes in the satellite's orientation due to external forces transverse to the bias momentum axis. Satellites using this technique are generally referred to as "momentum bias" satellites. Angular momentum bias is usually provided by a number of momentum or reaction wheels which spin at least part of the satellite. The bias axis set by the spin of the momentum wheels is generally perpendicular to the direction of the orbit of the satellite. Although the bias momentum resists changes in the satellite's orientation in directions transverse to the bias momentum axis, it is still necessary to provide control for correcting variations in the satellite's orientation along the bias axis. Different methods of controlling the satellite's attitude, such as feedback loops, are known in the art.

For most bias momentum satellites, the satellite payload, i.e., the part of the satellite carrying at least the antenna, is oriented differently than the momentum wheel. It is therefore necessary to provide means for correcting the orientation of the payload with respect to the orientation of the momentum attitude. Typically, the satellite's payload is defined in three axes referred to as the yaw, roll and pitch axes. If the satellite is in a geosynchronous orbit, the yaw axis is generally directed from the satellite to the center of the earth, the pitch axis is generally directed normal to the plane of the orbit of the satellite and the roll axis is generally perpendicular to the yaw and pitch axes, in a direction of travel of the satellite as is well known in the art.

One particular disturbance torque which affects the pointing of a geosynchronous satellite is the disturbance torque which can be equated to solar pressure caused by particles from the sun hitting the satellite. A satellite in a geosynchronous orbit will be eclipsed from the sun one time per revolution of the earth, and thus, the solar pressure on the satellite will go to zero during the eclipse. Typically, the attitude control mechanisms in use on the satellite will compensate for the effect of solar pressure. However, on a momentum bias satellite without direct yaw sensing, disturbance torques are typically estimated with relatively long time constants. These estimated disturbance torques are used by the satellite's attitude control system to create equal and opposite control torques to eliminate or reduce satellite attitude transients. Compared with these time constants, the solar pressure disturbance torque undergoes a rapid transient during eclipses, both when going from full solar pressure disturbance to zero disturbance, and then returning to full disturbance from zero, generally within a matter of minutes. This change is too fast for the disturbance torque sensing to track, and thus leads to potentially large satellite attitude disturbances, especially about the yaw axis.

What is needed then is a method to calculate the changes in solar disturbance torques caused by eclipses in order to compensate for this effect on the pointing of the satellite. It is therefore an object of the present invention to provide such a method.

SUMMARY OF THE INVENTION

This invention discloses a method of determining the presence of a solar eclipse on a satellite, and then compensating for the effect of no solar pressure on the satellite as to the satellite's pointing direction. More particularly, when the solar pressure from the sun goes to zero or is significantly reduced as a result of an eclipse, electrical power delivered by the solar cells also goes to zero and the batteries in the satellite automatically begin discharging to provide the necessary power to operate the satellite. According to one preferred embodiment of the present invention, the battery discharge current is monitored and when it exceeds a predetermined threshold as would be caused by the battery discharging, estimated solar disturbance torques to compensate for solar pressure are set to zero. Once the battery discharge current falls below the threshold, i.e., after the eclipse, the estimated solar disturbance torques are reinstated. It is possible to measure the current indicating solar eclipse by other methods such as current through the solar panels or some other electrical current which changes when the satellite enters and leaves solar eclipses.

Additional objects, advantages, and features of the present invention will become apparent from the following description and appended claims, taken in conjunction with the accompanying drawings.

DETAILED DESCRIPTION OF THE PREFERRED EMBODIMENT

The following discussion of the preferred embodiments concerning solar pressure disturbance compensation of a satellite's attitude is merely exemplary in nature and is in no way intended to limit the invention or its application or uses.

Figure 1:
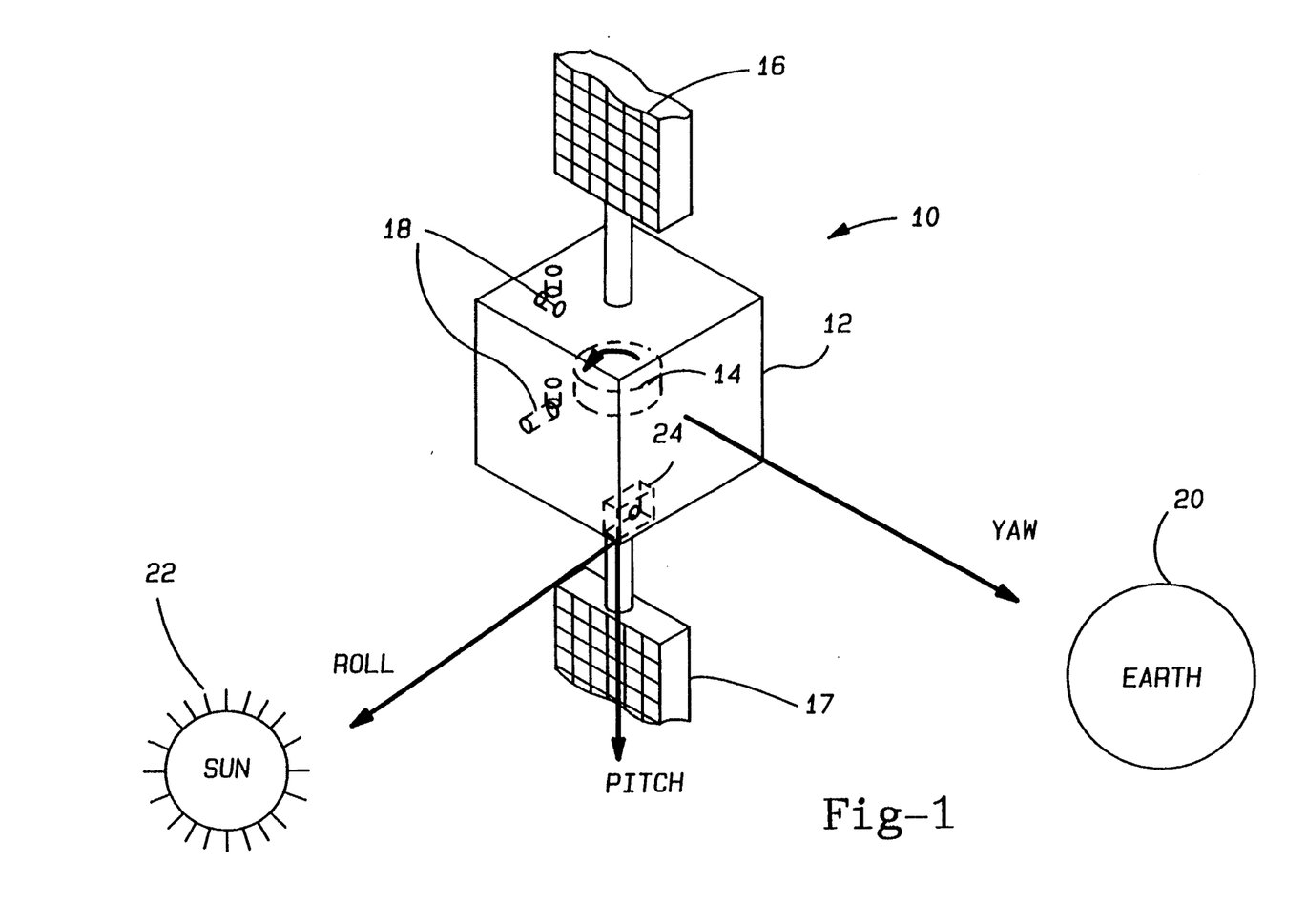
FIG. 1 is a diagram of a momentum bias satellite orbiting the earth which may incorporate compensation for the effects of solar pressure according to a preferred embodiment of the present invention.

Before going on to the specifics of the invention, it may be helpful to get an overview of the type of satellite which may incorporate the invention. To get this understanding, first turn to FIG. 1. In FIG. 1, the relationship of a momentum bias satellite 10 orbiting the earth 20 and relative to the sun 22 is shown. Satellite 10 includes a satellite central body 12, here depicted as a cube. By representing body 12 of satellite 10 as a cube it is easier to visualize the coordinates of the satellite's axes of yaw, roll and pitch. As discussed above, the yaw axis is the axis directed from the attitude of the satellite body 12 to the center of the earth 20, the pitch axis is directed normal to the orbit of satellite 10 and normal to the yaw axis, and the roll axis is perpendicular to the yaw and pitch axes, in a direction along travel of satellite 10. Each of these axes are shown in a directional manner in FIG. 1.

Satellite 10 includes a momentum wheel 14 which spins in a particular direction, here clockwise as shown, in order to stabilize satellite 10 in its orbit. The axis of rotation of momentum wheel 14 is generally parallel to the pitch axis of the satellite's body 12. The momentum wheel 14 is typically oriented separate from the reference of the satellite body 12. In one example, the orientation of the momentum wheel 14 will be on a 2-axis gimbal. The momentum wheel 14, in this example, is an actuator which adjusts and maintains the satellite's attitude. The pitch axis and momentum axis would be oriented substantially perpendicular to the equatorial plane of the earth 20 if satellite 10 were in a geosynchronous orbit.

Satellite 10 further includes an array of integrating gyros 18 and a thermopile earth sensor 24. Integrating gyros are generally used to orient the satellite 10 in a desirable configuration when the satellite 10 reaches its geosynchronous altitude as is known in the art. In normal operation of satellite 10, integrating gyros 18 would not be used. Earth sensor 24, sometimes referred to as a horizon sensor, senses the horizon of the earth in order to establish an inertial reference frame for the proper orientation of the satellite 10. An earth sensor will typically measure the satellite's orientation in the roll and pitch directions. Other types of sensors, including but not limited to star sensors, sun sensors, gyros and ground beacon sensors, could also provide the necessary sensing of the satellite's attitude. Projecting from satellite body 12 are dual solar wings 16 and 17 shown here in a cut-away format. Solar wings 16 and 17 are directed perpendicular to the rays of the sun in order to provide the necessary power to the systems on satellite 10.

As discussed above, the solar pressure applied to an orbiting satellite from the sun causes the satellite to deviate from its desirable attitude. Since these satellites are typically equipped with sensing mechanisms in order to determine attitude offsets, the solar pressure generally is compensated for by the attitude control mechanisms included on the satellite. When a satellite goes behind the earth and is eclipsed from the sun, solar pressure goes to zero, generally, within a matter of minutes. Due to the long reaction time of the attitude control compensation algorithms, because the sensors are calibrated to reduce errors, the negation of the solar pressure during an eclipse causes the satellite control mechanisms to overcompensate for the solar pressure and thus the satellite's attitude is affected undesirably. Consequently, this invention proposes detecting the presence of a solar eclipse in order to eliminate the compensation due to solar pressure during the eclipse relatively quickly. In a particular case, where the disturbance torques due to solar pressure cannot be discriminated from other disturbance torques, such as magnetic disturbance, etc., but are the dominant disturbance torques, the entire portion of the control torque which compensates constant disturbance torques could be set to zero.

Figure 2:
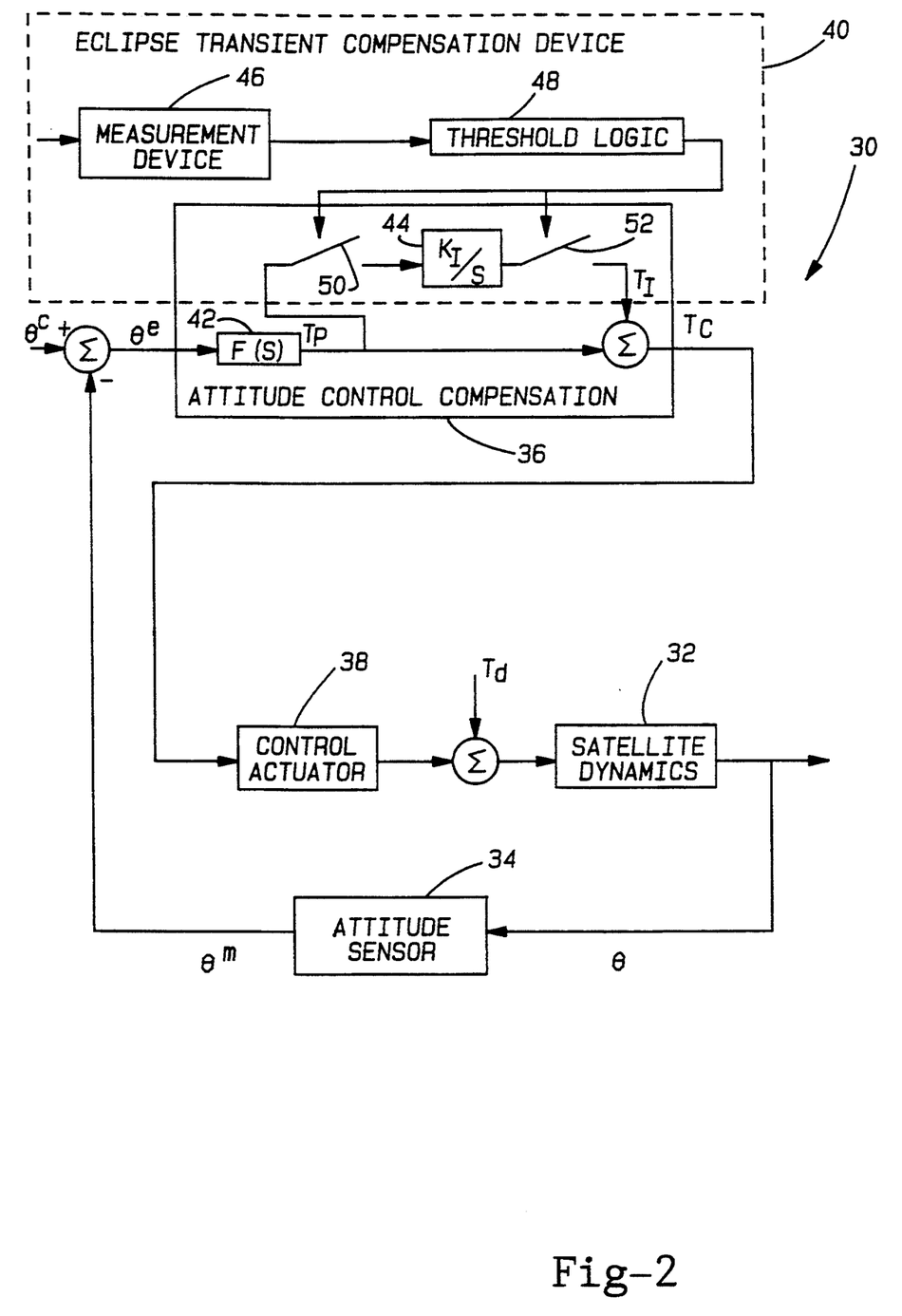
FIG. 2 is a schematic block diagram depicting a method of compensating for the effects of solar pressure according to one preferred embodiment of the present invention.

Now turning to FIG. 2, an implementation of a solar pressure compensation measuring scheme is shown in block diagram form according to one preferred embodiment of the present invention. More particularly, a compensation system 30 includes satellite dynamics 32 which represents the satellite on which the disturbance torques $T_d$ act upon, including those of solar pressure. The satellite dynamics 32 registers an attitude angle $\theta$ which is sensed by an attitude sensor 34. In this case, $\theta$ represents any or all of the satellite axes of pitch, roll and yaw. Attitude sensor 34 can be a variety of known attitude sensors, such as an earth sensor, ground beacon sensor, sun sensor or star sensor, as discussed above. Attitude sensor 34 generates an attitude measurement $\theta^m$ and applies it to a summation device as shown. Also applied to the summation device is a control angle signal $\theta^c$ which is the desired attitude of the satellite. An error signal $\theta^e$ is applied to an attitude control compensator 36 as the difference between the control angle signal $\theta^c$ and the measured angle $\theta^m$. The operation of attitude control compensator 36 will be discussed in greater detail below. The output $T_c$ of attitude control compensator 36 is a control torque which is applied to a control actuator 38. Control actuator 38 applies a compensation to the satellite attitude against the disturbance torques of $T_d$. For our satellite 10 above, the actuator is momentum wheel 14. However, other known actuators such as reaction wheels, thrusters, control moment gyros, etc. are also applicable. An eclipse transient compensation device 40 applies an input to attitude control compensator 36 in order to institute or withdraw the compensation control for compensating for solar pressure as will be discussed below.

The attitude control compensator 36 includes a proportional feedback compensation system 42, here labeled F(s), and an integrator system 44. The proportional feedback compensation system 42 includes a filtering characteristic which may also include lead/lag compensation as is known in the art. Proportional feedback compensation system 42 applies a gain to the attitude error signal $\theta^e$ to develop a control torque $T_p$. In most cases the value of $T_p$ will not be significant enough to completely null the attitude error. Therefore, integrator system 44 is included in order to provide an integrating function, here $K_I/S$, to the gain torque $T_p$ in order to completely null the disturbance. In other words, the integrating system 44 continuously integrates $T_p$ over time by the function $K_I/S$ to build up a control torque $T_I$ which when added to the control torque $T_p$ will eventually be large enough to null the disturbance torque. The function $K_I/S$ is the Laplace transform function of a known integrator. During the times when the solar pressure is not adding to the disturbance torques, i.e., during an eclipse, it is desirable to remove the integration factor $T_I$ from the control torque signal $T_c$ because the solar pressure is the major disturbance and thus the value $T_p$ alone is sufficient. Therefore, switches 50 and 52 are incorporated on both sides of integrator system 44, as shown, such that eclipse transient compensation device 40 can open the switches when it detects the satellite is being eclipsed from the sun. When the switches are open, $T_I$ is set to zero or to the known value of non-solar disturbance torques.

Eclipse transient compensation device 40 determines when the satellite is being eclipsed from the sun and provides a signal by which the switches 50 and 52 on both sides of integrator system 44 are to be opened during an eclipse. A current measurement device 46 measures the current through a satellite battery circuit (not shown) to determine a time when the batteries are discharging as would occur when the solar wings are not collecting power from the sun. It is noted that the current could be measured in other applicable circuits, such as the solar wing circuits, to determine if the batteries are discharging at a level which would indicate the solar wings are not being powered. This measured current is applied to a threshold logic circuit 48 which determines if the measured current is above a predetermined threshold. If the current traveling through the battery circuit is above a predetermined threshold, it is evidence that an eclipse is occurring and thus, the threshold circuit 48 will apply a signal on its output lines to open the switches 50 and 52 as discussed above. Once the satellite comes out from the eclipse and the solar cells on the solar wings again begin to charge, the battery stops discharging and the current measurement would then drop below the threshold. Thus, a signal from threshold logic circuit 48 would close the switches 50 and 52 again to compensate for the solar pressure in the manner as discussed above.

The embodiment discussed above for FIG. 2, specifically concerning the integral action in the attitude control compensation, only has the capability to control disturbance torques which are constant on the satellite. However, solar pressure can also cause disturbance torques which vary sinusoidally in a fixed satellite coordinate system with frequencies at multiples of the orbit rate. More particularly, a "secular" disturbance torque is one which is defined as fixed in inertial space, and thus, oscillates with a frequency of one cycle per orbit of the satellite. These cyclical disturbance torques can be compensated for by the satellite's attitude control system by including notch filters, known to those skilled in the art, at the desired frequencies. Therefore, in order to null these control torques due to the components during an eclipse, the outputs of the notch filters can be nulled during periods when the eclipses are detected.

Figure 3:
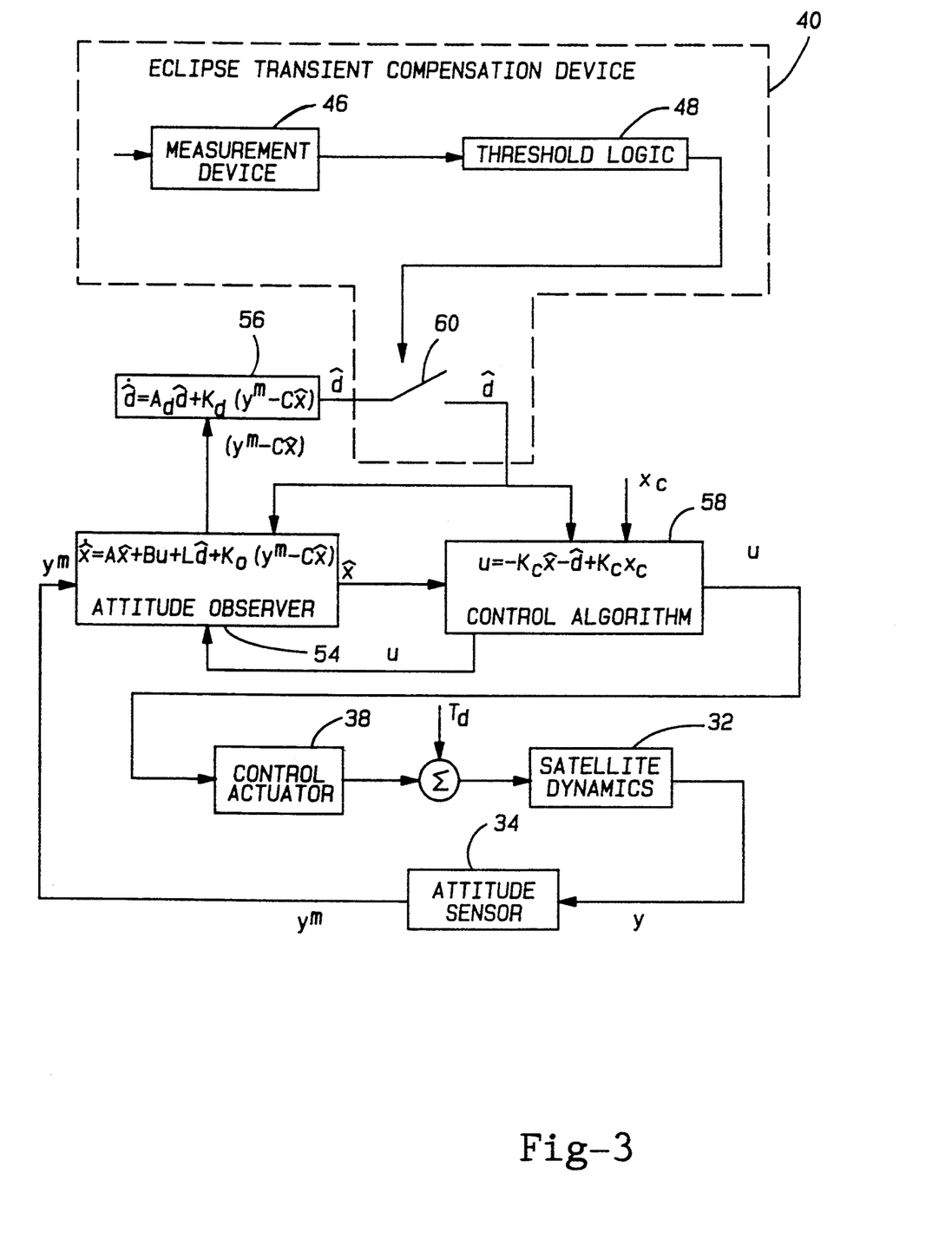
FIG. 3 is a schematic block diagram of a second method of compensating for the torque disturbances caused by solar pressure according to a second preferred embodiment of the present invention.

Now turning to FIG. 3, a specific implementation of the attitude control compensator 36 of FIG. 2 is shown in an observer-controller type format where the disturbance torques are explicitly estimated. As before, particular disturbance torques $T_d$ act on the satellite dynamics 32. The satellite dynamics attitude has an angle, here y, which is measured by attitude sensor 34. Attitude sensor 34 generates a measurement signal $y^m$ to a satellite attitude observer 54 which processes the measured attitude in a known algorithm depicted here as $\dot{\hat{x}} = A\hat{x} + Bu + K_o(y^m - C\hat{x}) + Ld$ where:

x is the state vector representing the instantaneous state of the satellite dynamics as modeled in the observer;

$\hat{x}$ is the estimate of x;

$\dot{x}$ is the time-derivative of x;

u is the control input to the satellite dynamics;

d is the estimate of the disturbance torque acting on the satellite (i.e., the estimate of $T_d$); $\dot{d}$ is the time derivative of d;

$K_o^x$ is the observer gain matrix; and

A,B,C and L represent the satellite dynamics as modelled in the observer.

The resultant value $\hat{x}$ is applied to a control algorithm 58 as the estimated attitude state of the satellite. An offset error, here $y^m - C\hat{x}$, from the difference between the desirable satellite attitude and the actual satellite attitude is applied to a disturbance torque observer 56 which computes the estimated disturbance torque $\hat{d}$ from the offset error by the function $\dot{\hat{d}} = A_d\hat{d} + K_d(y^m - Cx)$. The value d is applied to the attitude observer 54 to update the satellite's attitude as well as the control algorithm 58. The control algorithm 58 calculates a control signal u by a known control feedback algorithm $u = -K_c\hat{x} - \hat{d} + K_cX_c$ in order to determine the command value u which is given to the control actuator 38 to compensate for the disturbance torques. The control signal u is also applied to the attitude observer 54. As above, a measuring device 46 of eclipse transient compensator 40 measures the current from the discharging batteries on the satellite to determine if an eclipse is present. If the measured current from the discharging battery exceeds a predetermined threshold, then a signal from threshold logic circuit 48 will open a switch 60 in order that the estimated disturbance value d is not included in the control algorithm 58. When the switch is open, the value of the estimated disturbance torque a is set to zero or to the known value of non-solar disturbance torques. Consequently, the disturbance torques due to solar pressure is not compensated for during a time when an eclipse is detected.

Figure 4:
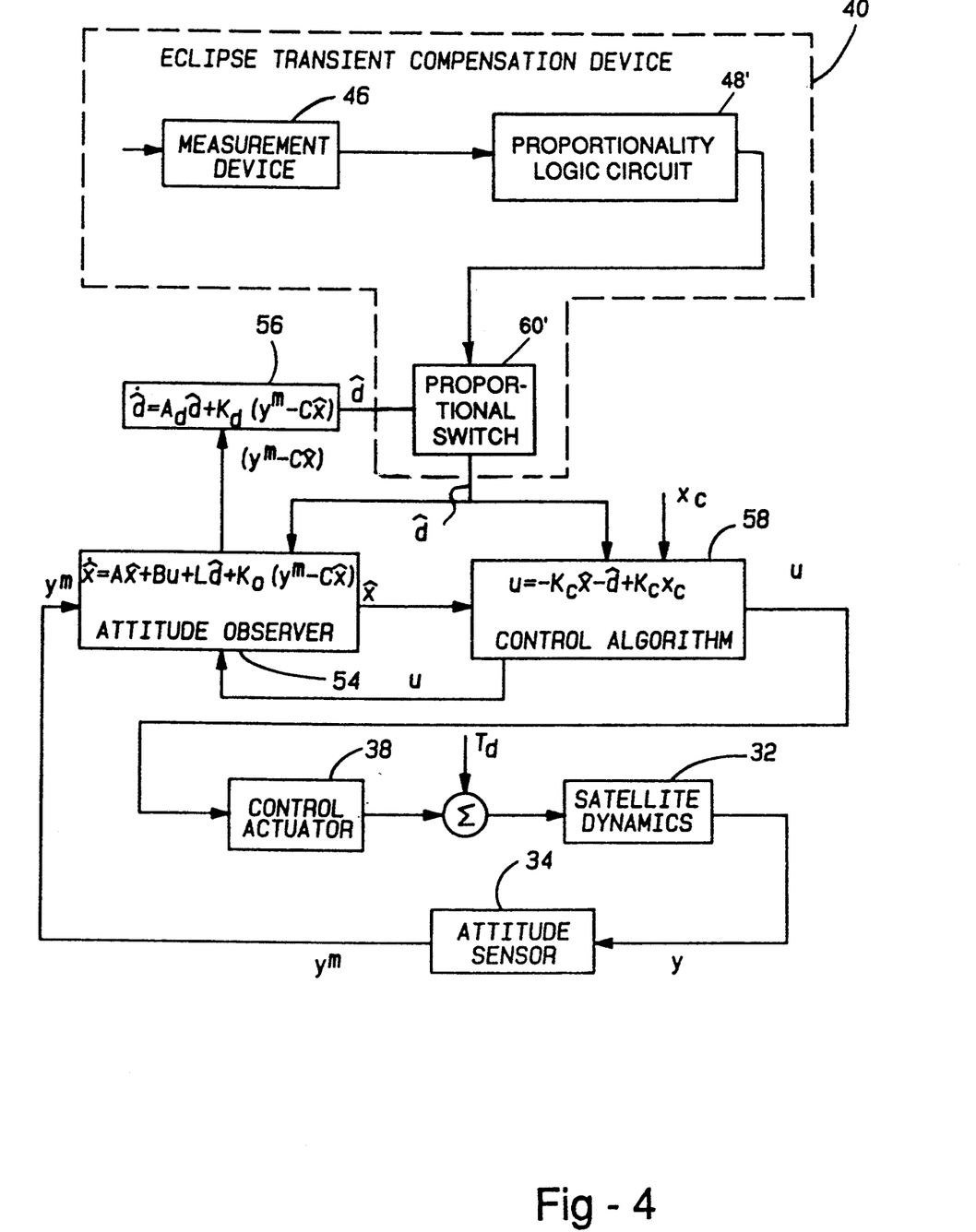
FIG. 4 is a schematic block diagram of a method of compensating for the torque disturbances caused by solar pressure wherein the compensation is proportional.

It is noted that the above described systems only have capability of determining two states, whether an eclipse is present or not, thus the compensation torque for solar pressure is either fully utilized or taken completely away. However, there are times when the solar pressure on the satellite is only partial, as would occur when the satellite is grazing the edge of the earth, such that a full eclipse is never realized. In these cases, the threshold logic circuit 48 may or may not indicate that an eclipse is present depending on whether the threshold value is met and the control torque will either be fully compensated for or not at all even though there is only partial solar pressure on the satellite. It is proposed therefore, as shown in FIG. 4, to implement another logic circuit 48' which will, instead of looking at a threshold value, have proportionality logic to determine how much current is being used, and thus, attempt to estimate what percentage of the sun is still visible to the satellite and via control means 60' set the compensation torque to a value proportional to the full value.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An apparatus for compensating for disturbances on an orbiting satellite, said apparatus being associated with said satellite, said apparatus comprising:
   actuation means for actuating the satellite in predetermined satellite axes in response to particular satellite attitude compensation control signals;
   control means for providing the compensation control signals to the actuation means in the predetermined axes, said control means receiving satellite attitude measurement signals from a sensor; and
   an eclipse transient compensation device, said eclipse transient compensation device providing an eclipse signal to the control means indicating the satellite is being eclipsed from the sun, said control means removing signals being applied to the actuation means from the control means for compensating for solar pressure on the satellite; and
   wherein the eclipse transient compensation device includes current measuring means to measure the current flow in a particular circuit associated with the satellite, said circuit carrying current indicative of whether a satellite battery is discharging.

2. An apparatus for compensating for disturbances on an orbiting satellite, said apparatus being associated with said satellite, said apparatus comprising:
   actuation means for actuating the satellite in predetermined satellite axes in response to particular satellite attitude compensation control signals;
   control means for providing the compensation control signals to the actuation means in the predetermined axes, said control means receiving satellite attitude measurement signals from a sensor; and
   an eclipse transient compensation device, said eclipse transient compensation device providing an eclipse signal to the control means indicating the satellite is being eclipsed from the sum, said control means removing signals being applied to the actuation means from the control means for compensating for solar pressure on the satellite; and
   wherein the eclipse transient compensation device includes a current measurement device for measuring the current in a battery circuit associated with the satellite and a threshold logic circuit, said current measurement device applying a current signal to the threshold logic circuit indicative of the level of current being measured by the current measurement device and the threshold logic circuit sending the eclipse signal to the control means if the current signal is above a predetermined threshold value.

3. An apparatus for compensation for disturbances on an orbiting satellite, said apparatus being associated with said satellite, said apparatus comprising:
   actuation means for actuating the satellite in predetermined satellite axes in response to particular satellite attitude compensation control signals;
   control means for providing the compensation control signals to the actuation means in the predetermined axes, said control means receiving satellite attitude measurement signals from a sensor; and
   an eclipse transient compensation device, said eclipse transient compensation device providing an eclipse signal to the control means indicating the satellite is being eclipsed from the sun, said control means removing signals being applied to the actuation means from the control means for compensating for solar pressure on the satellite; and
   wherein the control means includes gain means for applying a gain signal to the attitude measurement signals from the sensor to derive a first control torque signal, said first control torque signal being applied to an integration means for integrating the first control torque signal and deriving a second control torque signal, said first torque signal being added to said second torque signal to derive a third torque signal, said third torque signal being applied to the actuation means, wherein the eclipse signal from the eclipsed transient compensation device disengages the integration means such that the third torque signal equals the first torque signal.

4. An apparatus for compensating for disturbances on an orbiting satellite, said apparatus being associated with said satellite, said apparatus comprising:
   actuation means for actuating the satellite in predetermined satellite axes in response to particular satellite attitude compensation control signals;
   control means for providing the compensation control signals to the actuation means in the predetermined axes, said control means receiving satellite attitude measurement signals from a sensor; and
   an eclipse transient compensation device, said eclipse transient compensation device providing an eclipse signal to the control means indicating the satellite is being eclipsed from the sun, said control means removing signals being applied to the actuation means from the control
   wherein the control means includes a satellite attitude observer, a disturbance torque observer and a satellite control algorithm, said satellite attitude observer receiving the attitude measurement signal form the sensor and deriving an error signal and an attitude estimate signal, said error signal being the difference between the actual satellite attitude and the desirable satellite attitude, said error signal being applied to the disturbance torque observer, said disturbance torque observer deriving a corrected disturbance torque estimate from the error signal and applying it to the satellite attitude observer and the satellite control algorithm, said satellite control algorithm receiving the satellite attitude estimate and the corrected disturbance torque estimate to drive a control torque command which is then applied to the actuation means.

5. An apparatus for compensation for disturbances on an orbiting satellite, said apparatus being associated with said satellite, said apparatus comprising:
   actuation means for actuating the satellite in predetermined satellite axes in response to particular satellite attitude compensation control signals;
   control means for providing the compensation control signals to the actuation means in the predetermined axes, said control means receiving satellite attitude measurement signals from a sensor; and
   an eclipse transient compensation device, said eclipse transient compensation device providing an eclipse signal to the control means indicating the satellite is being eclipsed from the sun, said control means removing signals being applied to the actuation means from the control means for compensating for solar pressure on the satellite; and wherein the eclipse transient compensation device includes a current measurement device for measuring the current in a particular circuit associated with the satellite which carries current indicative of a satellite battery discharging and a proportionally logic circuit, said current measurement device applying a current signal to the proportionality logic circuit indicative of the level of current being measured by the current measurement device and the proportionally logic circuit sending the eclipse signal to the control means.

6. A method of maintaining an orbiting satellite in a predetermined satellite attitude against the disturbance of solar pressure on the satellite, said method comprising the steps of:

measuring the angle of the satellite's attitude relative to at least one predetermined axis;

applying the measured angle of the at least one predetermined axis to a control system;

calculating compensating control torques in the at least one predetermined axis to correct the attitude of the satellite in the at least one predetermined axis from a predetermined desirable satellite attitude position;

determining whether the satellite is in eclipse from the sun and applying an eclipse signal indicative of this determination to the control system, said control system calculating updated control torques in response to the eclipse signal to compensate for the lack of solar pressure on the satellite;

applying the control torques to a satellite actuation device; and actuating the satellite in response to the control torques; and wherein the step of determining whether the satellite is in an eclipse includes the step of measuring the current through a particular circuit associated with the satellite, said circuit carrying current indicative of whether a satellite battery is discharging.

7. A method of maintaining an orbiting satellite in a predetermined satellite attitude against the disturbance of solar pressure on the satellite, said method comprising the steps of:

measuring the angle of the satellite's attitude relative to at least one predetermined axis;

applying the measured angle of the at least one predetermined axis to a control system;

calculating compensating control torques in the at least one predetermined axis to correct the attitude of the satellite in the at least one predetermined axis from a predetermined desirable satellite attitude position;

determining whether the satellite is in eclipse from the sun and applying an eclipse signal indicative of this determination to the control system, said control system calculating updated control torques in response to the eclipse signal to compensate for the lack of solar pressure on the satellite;

applying the control torques to a satellite actuation device; and actuating the satellite in response to the control torques; and wherein the step of determining whether the satellite is in an eclipse includes the step of measuring the current through a particular circuit associated with the satellite which has current flow in response to discharge of battery circuits associated with the satellite, applying the measured current to a threshold circuit to determine if the measured current exceeded a predetermined threshold level, and applying the eclipse signal to the control system if the measured current exceeds the threshold value.

8. A method of maintaining an orbiting satellite in a predetermined satellite attitude against the disturbance of solar pressure on the satellite, said method comprising the steps of:

measuring the angle of the satellite's attitude relative to at least one predetermined axis;

applying the measured angle of the at least one predetermined axis to a control system;

calculating compensating control torques in the at least one predetermined axis to correct the attitude of the satellite in the at least one predetermined axis from a predetermined desirable satellite attitude position;

determining whether the satellite is in eclipse from the sun and applying an eclipse signal indicative of this determination to the control system, said control system calculating updated control torques in response to the eclipse signal to compensate for the lack of solar pressure on the satellite;

applying the control torques to a satellite actuation device; and actuating the satellite in response to the control torques; and wherein the step of calculating compensating control torques includes the steps of applying the measured attitude angle to a gain system for computing a control torque proportional to the measured attitude angle, applying the control torque signal to an integration means for integrating the control torque signal to develop an integrated signal, and adding the integrated signal to the control torque signal to drive a total control torque signal, said total control signal being applied to the actuation device.

9. A method of maintaining an orbiting satellite in a predetermined satellite attitude against the disturbance of solar pressure on the satellite, said method comprising the steps of:

measuring the angle of the satellite's attitude relative to at least one predetermined axis;

applying the measured angle of the at least one predetermined axis to a control system;

calculating compensating control torques in the at least one predetermined axis to correct the attitude of the satellite in the at least one predetermined axis from a predetermined desirable satellite attitude position;

determining whether the satellite is in eclipse from the sun and applying an eclipse signal indicative of this determination to the control system, said control system calculating updated control torques in response to the eclipse signal to compensate for the lack of solar pressure on the satellite;

applying the control torques to a satellite actuation device; and actuating the satellite in response to the control torques; and wherein the step of calculating compensating control torque includes the steps of applying the measured attitude angle to a satellite attitude observer to derive attitude estimates and an error signal between the desired satellite attitude and the actual satellite attitude, applying the error signal to a disturbance torque estimator for deriving an estimate of the disturbance torque being applied to the satellite, applying the disturbance torque signal to the attitude observer and to control algorithm, said control algorithm receiving the attitude estimates and estimate of the disturbance torque and deriving a control signal being applied to the actuation device.

10. A method of maintaining an orbiting satellite in a predetermined satellite attitude against the disturbance of solar pressure on the satellite, said method comprising the steps of:
- measuring the angle of the satellite's attitude relative to at least one predetermined axis;
- applying the measured angle of the at least one predetermined axis to a control system;
- calculating compensating control torques in the at least one predetermined axis to correct the attitude of the satellite in the at least one predetermined axis from a predetermined desirable satellite attitude position;
- determining whether the satellite is in eclipse from the sun and applying an eclipse signal indicative of this determination to the control system, said control system calculating updated control torques in response to the eclipse signal to compensate for the lack of solar pressure on the satellite;
- applying the control torques to a satellite actuation device; and actuating the satellite in response to the control torques; and
- wherein the step of determining if an eclipse is present includes the steps of measuring the current through a circuit associated with the satellite which carries a current indicative of whether batteries in the satellite are discharging and applying the measured current signal to a proportionality logic circuit in order to determine at what rate the batteries are being discharged.

11. A system compensating for solar pressure disturbances on an orbiting satellite, said system comprising:
- sensor means for measuring the satellite's attitude relative to predetermined satellite axes and providing an attitude measurement signal in the
- control means for receiving the attitude measurement signal and calculating satellite attitude compensation control signals in the predetermined axes;
- an eclipse transient compensation device, said eclipse transient compensation device measuring the current flow in a particular circuit associated with the satellite, said circuit carrying current indicative of whether a satellite battery is discharging, said eclipse transient compensation device providing an eclipse signal to the control means indicating the satellite is being eclipsed from the sun, said control means removing signals being applied to the actuation means from the control means for compensating for solar pressure on the satellite; and
- actuation means for actuating the satellite in the predetermined axes in response to the compensation control signals from the control means.

12. The system according to claim 11 wherein the eclipse transient compensation device includes a current measurement device for measuring the current in the particular circuit and a threshold logic circuit, said current measurement device applying a current signal to the threshold logic circuit indicative of the level of current being measured by the current measurement device and the threshold logic circuit sending the eclipse signal to the control means if the current signal is above a predetermined threshold value.

13. The system according to claim 11 wherein the eclipse transient compensation device includes a current measurement device for measuring the current in the particular circuit and a proportionality logic circuit, said current measurement device applying a current signal to the proportionality logic circuit indicative of the level of current being measured by the current measuring device and the proportionality logic circuit sending the eclipse signal to the control means indicative of the extent to which the satellite is being eclipsed from the sun.

14. The system according to claim 11 wherein the sensor is an inertia sensor selected from the group consisting of an earth sensor, a star sensor, a sun sensor, a ground beacon sensor and a gyro, said inertia sensor measuring the angle of the satellite attitude relative to a predetermined desirable satellite attitude along the predetermined axes and outputting a signal representative of these angles to the control means.

* * * * *